United States Patent
Han et al.

(10) Patent No.: US 10,691,996 B2
(45) Date of Patent: Jun. 23, 2020

(54) HARDWARE ACCELERATOR FOR COMPRESSED LSTM

(71) Applicant: DeePhi Technology Co., Ltd., Beijing (CN)

(72) Inventors: Song Han, Stanford, CA (US); Dongliang Xie, Beijing (CN); Junlong Kang, Beijing (CN); Yubin Li, Beijing (CN)

(73) Assignee: BEIJING DEEPHI INTELLIGENT TECHNOLOGY CO., LTD., Beijing (CN)

(*) Notice: Subject to any disclaimer, the term of this patent is extended or adjusted under 35 U.S.C. 154(b) by 660 days.

(21) Appl. No.: 15/380,494

(22) Filed: Dec. 15, 2016

(65) Prior Publication Data
US 2018/0174036 A1 Jun. 21, 2018

(51) Int. Cl.
*G06N 3/06* (2006.01)
*G06N 3/04* (2006.01)
*G06N 3/063* (2006.01)
*G06N 3/08* (2006.01)

(52) U.S. Cl.
CPC ........... *G06N 3/0445* (2013.01); *G06N 3/063* (2013.01); *G06N 3/082* (2013.01)

(58) Field of Classification Search
CPC .......... G06N 3/04; G06N 3/0445; G06N 3/06; G06N 3/063
See application file for complete search history.

(56) References Cited

U.S. PATENT DOCUMENTS 9,558,156 B1* 1/2017 Bekas ............... G06F 17/16
2017/0103305 A1* 4/2017 Henry ............... G06N 3/063

OTHER PUBLICATIONS

"Accelerating Recurrent Neural Networks in Analytics Servers: Comparison of FPGA, CPU, GPU, and ASIC," Eriko Nurvitadhi, Jaewoong Sim, David Sheffield, Asit Mishra, Srivatsan Krishnan, and Debbie Marr, DOI: 10.1109/FPL.2016.7577314, published on IEEE Xplore Sep. 29, 2016 (Year: 2016).*
ESE: Efficient Speech Recognition Engine with Compressed LSTM on FPGA, arxiv.org, article ID 1612.00694v1 (https://arxiv.org/abs/1612.00694), Dec. 1, 2016.
EIE: Efficient Inference Engine on Compressed Deep Neural Network, arxiv.org, article ID 1602.01528v2 (https://arxiv.org/abs/1602.01528), May 3, 2016.

* cited by examiner

*Primary Examiner* — Hal Schnee
(74) *Attorney, Agent, or Firm* — IPro, PLLC

(57) ABSTRACT

Hardware accelerator for compressed Long Short Term Memory (LSTM) is disclosed. The accelerator comprise a sparse matrix-vector multiplication module for performing multiplication operation between all sparse matrices in the LSTM and vectors to sequentially obtain a plurality of sparse matrix-vector multiplication results. A addition tree module are also included for accumulating a plurality of said sparse matrix multiplication results to obtain an accumulated result. And a non-linear operation module passes the accumulated results through an activation function to generate non-linear operation result. That is, the present accelerator adopts pipeline design to overlap the time of data transfer and computation for compressed LSTM.

14 Claims, 6 Drawing Sheets

| Data Fetch | Sigmoid | $W_{ix}$ | $W_{fx}$ | $W_{cx}$ | $W_{ir}$ | $W_{fr}$ | $W_{cr}$ | $W_{ox}$ | $W_{or}$ | N/A | $W_{ym}$ | $W_{ix}$ |
|---|---|---|---|---|---|---|---|---|---|---|---|---|
| | | P | P | P | P | P | P | P | P | N/A | P | P |
| | Tanh | x | $b_i$ | $W_{ic}$ | P | $b_f$ | $b_c$ | $b_o$ | $W_{oc}$ | N/A | N/A | x |
| Computation | | N/A | $W_{ix}X_t$ | $W_{fx}X_t$ | $W_{cx}X_t$ | $W_{ir}Y_{t-1}$ | $W_{fr}Y_{t-1}$ | $W_{cr}Y_{t-1}$ | $W_{or}Y_{t-1}$ | N/A | N/A | $y_t$ |
| | | N/A | N/A | $W_{ic}C_{t-1}$ | $W_{cf}C_{t-1}$ | $i_t$ | $f_t$ | $g_t$ | $c_t$ | $W_{oc}C_t$ | $h_t$ $o_t$ $m_t$ | N/A |
| STATE | | INITIAL | STATE_1 | | STATE_2 | | STATE_3 | | STATE_4 | | STATE_5 | STATE_6 |

Fig. 4

HARDWARE ACCELERATOR FOR COMPRESSED LSTM

BACKGROUND OF THE DISCLOSURE

Long Short Term Memory (LSTM) is a specific Recurrent Neural Network (RNN) architecture, and capable of learning long-term dependencies. A conventional RNN can learn from previous information, but it fails to learn long-term dependencies. LSTM explicitly adds memory controllers to decide when to remember, forget and output. It can make the training procedure much more stable and allow the model to learn long-term dependencies.

LSTM architecture is widely used in sequence learning, such as speech recognition. State-of-the-art model have millions of connections, and are both computationally and memory intensive. Deploying such bulky model results in high power consumption given latency constraint.

It has been widely observed that deep neural networks usually have a lot of redundancy, so network pruning has been widely studied to compress neural network including LSTM. However, most hardware accelerators mainly focus on deep neural network (DNN) or uncompressed LSTM.

SUMMARY OF THE DISCLOSURE

This specification describes an efficient hardware architecture for efficiently operating on compressed LSTM. To speed up the prediction and make it energy efficient, the hardware architecture works directly on the compressed LSTM model. The architecture can al so encode and partition the compressed model to each Processing Element (PE) for parallelism, and schedule the complicated LSTM data flow.

In a general aspect, a hardware accelerator of LSTM comprises a sparse matrix-vector multiplication module for performing multiplication operation between all sparse matrices in the LSTM and vectors to sequentially obtain a plurality of sparse matrix-vector multiplication results. The hardware accelerator further comprises an addition tree module for accumulating a plurality of said sparse matrix multiplication results to obtain an accumulated result and a non-linear operation module for passing the accumulated results through an activation function to generate non-linear operation result.

In another aspect, the hardware accelerator further comprises an element-wise multiplication module for performing element-wise multiplication and addition operations on a plurality of said non-linear operation results to obtain a first intermediate result vector of the current cycle.

In another aspect, the hardware accelerator further comprises a diagonal matrix multiplication module for performing a multiplication operation between a diagonal matrix and the first intermediate result vector of the current cycle or the first intermediate result vector of the previous cycle to obtain a diagonal matrix multiplication result. The addition tree module further accumulates the diagonal matrix multiplication results into the accumulated results.

In another aspect, the computation and data-fetching of the hardware accelerator can be fully overlapped. The computation process is divided into two layers in parallel: one layer is the multiplication operation of the sparse matrix-vector multiplication module which in turn performs the multiplication operation between the plurality of sparse matrices and the corresponding vectors, and the other layer is the other calculation operation of the other calculation modules than the sparse matrix-vector multiplication module, the other computation operations are performed serially.

In yet another aspect, the hardware accelerator is implemented as an Application Specific Integrated Circuit (ASIC) core, or alternatively as a field-programmable gate array (FPGA).

In a general aspect, a speech recognition engineer accelerator system comprises a processor configured to execute speech recognition that use a compressed LSTM as an acoustic model. The system further comprises a hardware accelerator for the compressed LSTM.

In another aspect, the hardware accelerator is implemented as a part of a FPGA structure. The Structure further comprises buffers for data preparing and storing and controller for scheduling data-fetch and LSTM computation pipeline flow of the hardware accelerator.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 4 illustrates an exemplary data flow of the hardware accelerator; and

DETAILED DESCRIPTION OF THE DISCLOSURE

For convenience in description herein, the term "matrix," which usually refers to a two-dimensional array of elements, may be used herein to also refer to a vector, which usually refers to a one-dimensional array of elements.

Long Short Term Memory (LSTM) is a specific Recurrent Neural Network (RNN) architecture, and capable of learning long-term dependencies. LSTM and conventional RNNs have been successfully applied to various sequence prediction and sequence labeling tasks. A conventional RNN has been shown to be successful in various applications, such as speech recognition, machine translation and scene analysis.

One main feature of RNN is that it can learn from previous information. But the question is how far should a model remember, and what to remember. The conventional RNN can retain and use recent past information. But it fails to learn long-term dependencies. LSTM explicitly adds memory controllers to decide when to remember, forget and output. It can make the training procedure much more stable and allow the model to learn long-term dependencies.

LSTM architecture is often used in large scale acoustic modeling and for computing acoustic output probabilities. LSTM is the most computation and memory intensive part; thus, need accelerate the LSTM computation.

Figure 1:
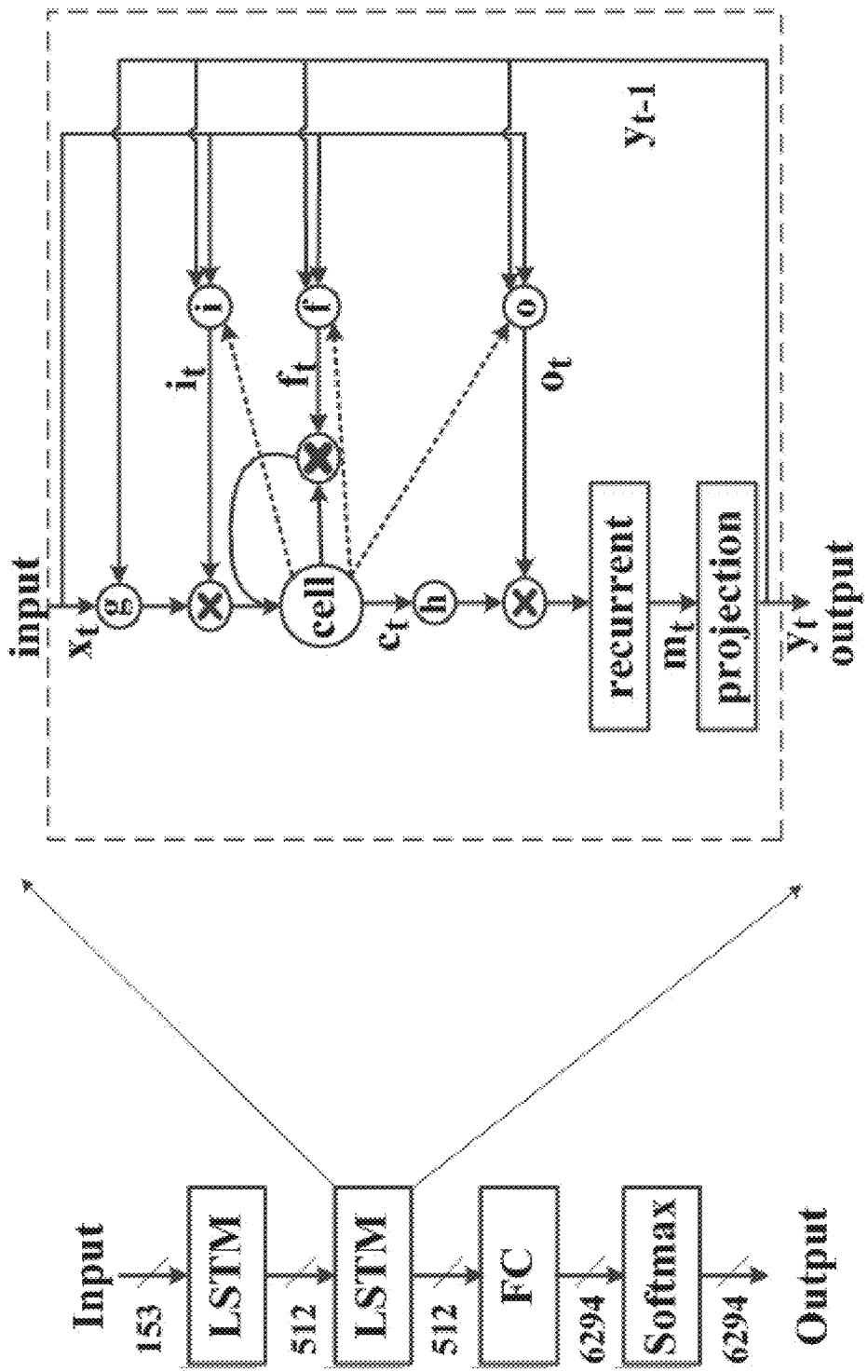
FIG. 1 illustrates the basic structure of LSTM.

FIG. 1 illustrates the basic structure of LSTM. LSTM is one type of RNN, where the input at time T depends on the output at T−1. Compared to the traditional RNN, LSTM contains special memory blocks in the recurrent hidden layer. The memory cells with self-connections in memory blocks can store the temporal state of the network. The memory blocks also contain special multiplicative units called gates: input gate, output gate and forget gate. The input gate i controls the input data flow into the memory cell. The output gate o controls the output flow into the rest of the network. The forget gate f scales the internal state of the cell before adding it as input to the cell, which can adaptively forget the cell's memory. In addition, as shown by dash lines in FIG. 1, the modern LSTM architecture contains peephole connections from its internal cells to the gates to learn precise timing of the outputs. An LSTM network accepts an input sequence $x=(x_1; \ldots ; x_T)$, and computes an output sequence $y=(y_1; \ldots ; y_T)$ by using the following equations iteratively from t=1 to T:

$$i_t = \sigma(W_{ix}x_t + W_{iy}y_{t-1} + W_{ic}c_{t-1} + b_i) \quad (1)$$

$$f_t = \sigma(W_{fx}x_t + W_{fy}y_{t-1} + W_{fc}c_{t-1} + b_f) \quad (2)$$

$$c_t = f_t \odot c_{t-1} + i_t \odot g(W_{cx}x_t + W_{cy}y_{t-1} + b_c) \quad (3)$$

$$o_t = \sigma(W_{ox}x_t + W_{oy}y_{t-1} + W_{oc}c_t + b_o) \quad (4)$$

$$m_t = o_t \odot h(c_t) \quad (5)$$

$$y_t = W_{ym}m_t \quad (6)$$

Here the W terms denote weight matrices (e.g. $W_{ix}$ is the matrix of weights from the input to the input gate), and $W_{ic}$, $W_{fc}$, $W_{ac}$ are diagonal weight matrices for peephole connections. The b terms denote bias vectors, while σ is the logistic sigmoid function. The symbols i, f, o, c and m are respectively the input gate, forget gate, output gate, cell activation vectors and cell output activation vectors, and all of which are the same size. The symbols g and h are the cell input and cell output activation functions.

It has been widely observed that deep neural networks usually have a lot of redundancy, so network pruning has been widely studied to compress neural network including LSTM. At the same time, the most of hardware accelerators mainly focus on deep neural network (DNN) or uncompressed LSTM. To efficiently operate on compressed LSTM, an efficient hardware architecture is proposed.

Figure 2:
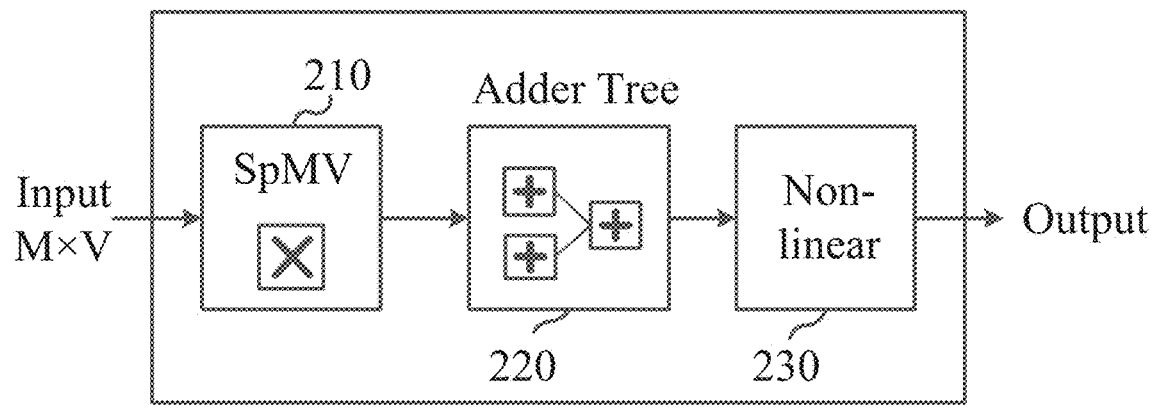
FIG. 2 illustrates an exemplary hardware accelerator for compressed LSTM in accordance with the principles of the disclosure herein.

FIG. 2 illustrates an exemplary hardware accelerator for compressed LSTM in accordance with the principles of the disclosure herein. The hardware accelerator 200 may include a sparse matrix-vector multiplication module (SpMV) 210 for performing multiplication operation between sparse matrix and vector, an addition tree module 220 and a non-linear operation module 230.

Matrix-vector multiplication (M×V) is a basic building block in a wide range of neural networks and deep learning applications. In RN, M×V operations are performed on the new input and the hidden state at each time step, producing a new hidden state and the output. LSTM is a widely-used structure of RNN cell that provides more complex hidden unit computation. Each LSTM cell can be decomposed into eight M×V operations, two for each: input gate, forget gate, output gate, and one temporary memory cell. RNN, including LSTM, is widely used in image captioning, speech recognition and natural language processing.

During M×V, the memory access is usually the bottleneck especially when the matrix is larger than the cache capacity. There is no reuse of the input matrix, thus a memory access is needed for every operation. On CPUs and GPUs, this problem is usually solved by batching, i.e., combining multiple vectors into a matrix to reuse the parameters. However, such a strategy is unsuitable for real-time applications that are latency-sensitive, such as pedestrian detection in an autonomous vehicle, because batching substantially increases latency. Therefore, it is preferable to create an efficient method of executing large neural networks without the latency cost of batching.

Because memory access is the bottleneck in large layers, compressing the neural network offers a solution. Though compression reduces the total number of operations, the irregular pattern caused by compression hinders the effective acceleration on CPUs and CPUs. A compressed network is not efficient on previous accelerators either. Previous SpMV accelerators can only exploit the static weight sparsity. They are unable to exploit dynamic activation sparsity. Previous DNN accelerators cannot exploit either form of sparsity and must expand the network to dense form before operation. Neither can exploit weight sharing. Neither can accelerate RNN and LSTM. This motivates building a special engine that can operate on a compressed network, especially on a compressed LSTM.

SpMV 210 may perform multiplication operation between all sparse matrices in the LSTM and vectors to sequentially obtain a plurality of sparse matrix-vector multiplication results. The addition tree module 220 accumulates a plurality of said sparse matrix multiplication results to obtain an accumulated result. The non-linear operation module 230 passes the accumulated results through an activation function to generate non-linear operation result.

Figure 3:
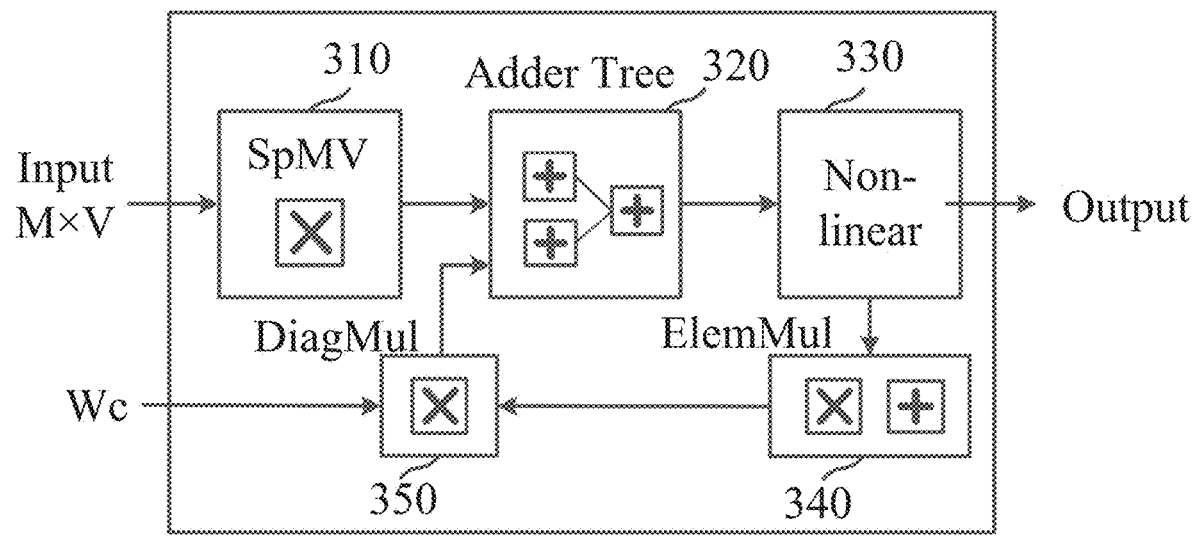
FIG. 3 illustrates another exemplary hardware accelerator for compressed LSTM in accordance with the principles of the disclosure herein.

The hardware accelerator may include several other modules to further adapt the characteristics of the compressed LSTM. FIG. 3 illustrates another exemplary hardware accelerator for compressed LSTM in accordance with the principles of the disclosure herein. In addition to SpMV, addition tree module and a non-linear operation module, the hardware accelerator 300 may include element-wise multiplication module (ElemMul) 340, and optionally, diagonal matrix multiplication module 350.

ElemMul 340 may perform element-wise multiplication and addition operations on a plurality of non-linear operation results generated by module 330 to obtain a first intermediate result vector of the current cycle. Diagonal matrix multiplication module 350 may perform a multiplication operation between a diagonal matrix and the first intermediate result vector of the current cycle or the first intermediate result vector of the previous cycle to obtain a diagonal matrix multiplication result. Addition tree module 330 further accumulates the diagonal matrix multiplication results into the accumulated results. In a preferred embodiment, diagonal matrix multiplication module 350 can be a second element-wise multiplication module (ElemMul) 350.

Figure 5:
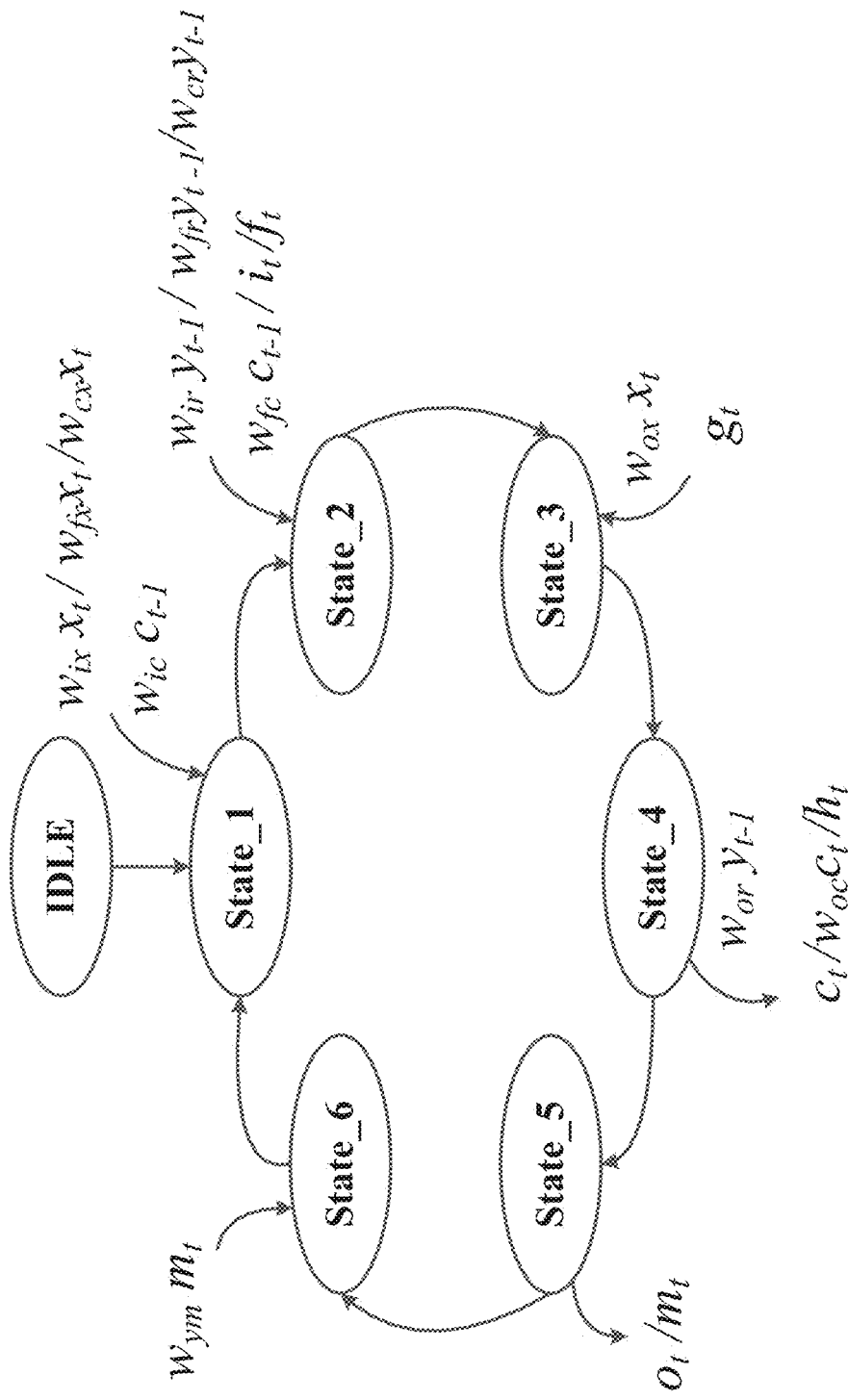
FIG. 5 illustrates the state machine in scheduler's state machine of FIG. 4.

During the whole operation of the hardware accelerator, the most expensive operations are SpMV and ElemMul. Those operations can be partitioned into the two kinds: I/O requests and computing state. LSTM is a complicated dataflow. A good accelerator need meet the data dependency and have more parallelism at the same time. FIG. 4 illustrates an exemplary data flow of the hardware accelerator, while FIG. 5 illustrates the state machine in scheduler's state machine of FIG. 4. Computation and data-fetching operations in each state are included. From state INITIAL to STATE 6, accelerator completes the LSTM network.

As shown in FIG. 4, computation and data-fetching are fully overlapped. First three lines operations are fetching weights, pointers, vectors/diagonal matrix/bias respectively to prepare for the next computation. Operations in the fourth line are matrix-vector multiplications, and that in the fifth line are element-wise multiplications or accumulations. Operations in the horizontal direction must be executed sequentially, while those in the vertical direction are executed concurrently. This is determined by the feature of LSTM and hardware system. For example, we can calculate $W_{fi}y_{t-1}$ and it concurrently (see formulas (1)-(6)), because the two operations are not dependent on each other in the LSTM network, and they can be executed by two independent computation units in hardware system. $W_{ix}y_{t-1}/W_{ic}c_{t-1}$ must be executed sequentially, because it is dependent on the former operations in LSTM network.

As shown in FIG. 5, the computation for compressed LSTM can be separated into six sequential stages:

1) Compute $W_{ix}x_t$, $W_{fx}x_t$, $W_{ix}x_t$ in order, $W_{ic}c_{t-1}$ and $W_{ix}x_t$ are computed simultaneously.

2) Compute $W_{ic}y_{t-1}$, $W_{fc}y_{t-1}$, $W_{cr}y_{t-1}$ in order, $W_{fc}c_{t-1}$ and $W_{ic}y_{t-1}$, $W_{fc}y_{t-1}$ and $i_t$, $f_t$ and $W_{cr}y_{t-1}$ are computed simultaneously.

3) Compute $W_{ox}x_t$ and $g_t$ simultaneously.

4) Compute $W_{or}y_{t-1}$ and $c_t$, $W_{oc}c_t$, $h_t$ simultaneously. $W_{oc}c_t$ and $h_t$ can be computed after several cycles While getting $c_t$.

5) Compute $o_t$, after a few cycles, calculate $m_t$.

6) Compute $W_{ym}m_t$.

According to the above principles, the input timing of the plurality of different data and the operation timing of the plurality of calculation processes can be set in parallel, per the dependency of the calculation processes on the data. More specifically, an input operation or other calculation process for the data involved in a calculation process can set before said one calculation process, while a data input operation unrelated to the calculation process can be set in parallel. The calculation process is divided into two layers in parallel: one layer is the multiplication operation of the sparse matrix-vector multiplication module which in turn performs the multiplication operation between the plurality of sparse matrices and the corresponding vectors, and the other layer is the other calculation operation of the other calculation modules than the sparse matrix-vector multiplication module, the other computation operations are performed serially.

Thus, diagonal matrix multiplication module (or ElemMul 350) can perform the multiplication operation of the corresponding diagonal matrix and the first intermediate result vector of the previous cycle before the addition tree module completes the first accumulation operation of the current cycle, while perform a multiplication operation of the diagonal matrix and the first intermediate result vector of the current cycle after the element-wise multiplication module obtains the first intermediate result vector of the current cycle.

In one embodiment, according to those formulas (1)-(6) mentioned above, SpMV 310 may perform a sparse matrix multiplication operation on the input vector of the current cycle $x_t$, the output vector of the previous cycle $y_{t-1}$, and the second intermediate result vector of the current cycle $m_t$, wherein the second intermediate result vector of the current cycle $m_t$ is calculated based on the input vector of the current cycle $x_t$, the output vector of the previous cycle $y_{t-1}$, and the first intermediate result vector of the current cycle $C_t$. Then, SpMV 310 Obtains the output vector of the current cycle $y_t$ by performing sparse matrix-vector multiplication operation on the second intermediate result vector of the current cycle $m_t$.

In another embodiment, the non-linear operation result may comprise: the input gate control vector of the current cycle $i_t$; the forget gate control vector of the current cycle $f_t$; the output gate control vector of the current cycle $o_t$; the cell input activation vector of the current cycle $g_t$; and the cell output activation vector of the current cycle $h_t$. The first intermediate result vector can be a cell activation vector of the current cycle $c_t$, while the second intermediate result vector can be a cell output activation vector of the current cycle $m_t$.

In some cases, bias can be added into the model to optimize the performance. Thus, SpMV 310 can further add a bias vector to the sparse matrix-vector multiplication result. Or, tree module further can accumulate a bias vector into the accumulated result, instead.

To further enhance performance, in addition to hardware improvements, software and algorithms can be optimized either, to enhance the overall system. To exploit the sparsity of activations, the encoded sparse weight matrices in the compressed LSTM can be stored in special format, for example, in a variation of compressed sparse column (CSC) format. The detailed description of the CSC format can be found in Song Han (the inventor of the present application) et al "EIE: efficient inference engine on compressed deep neural network". arXIV preprint arXiv:1602.01528, 2016, which is incorporated herein by reference in its entirety. Storing the sparse matrix by columns in CSC format makes it easy to exploit activation sparsity. The inventor can simply multiply each non-zero activation by all the non-zero elements in its corresponding column.

At algorithm level, the weight matrices can be pruned from the hardware efficiency perspective, by introducing load-balance-aware pruning. The load-balance-aware pruning can produce the same compression rate among all the sub-matrices. The matrix is divided into several parts, and each part belongs to a Processing Element (PE, which will be discussed below with FIG. 6) of the SpMV for parallel processing.

To achieve high parallelism and to meet latency constraint, the SpMV may include multiple buffers. In one embodiment, SpMV may include two sparse matrix buffers, two pointer buffers and two output buffers. Two sparse matrix buffers are configured in alternate buffer mode for buffering sparse matrix coefficients, two pointer buffers are configured in alternate buffer mode for buffering pointers representing non-zero coefficient start positions in each column of said sparse matrix, while two output buffers are configured in alternate buffer mode to output the calculation result from one output buffer while the other output buffer is used to buffer the calculation result. Those buffers can be combined with PEs to be discussed below, accommodating the above-described optimized stored sparse matrices.

To achieve high parallelism and to meet latency constraint, the hardware accelerator may also include some buffers for I/O requests. For example, the hardware accelerator may include a vector input module and an output module. Vector input module can input a vector to be calculated to SpMV, while output module connected to SpMV can output a final calculation result vector of the current cycle. Output module also can have a buffer for buffering the final calculation result vector of the previous cycle and supplying it to the vector input module.

Figure 6:
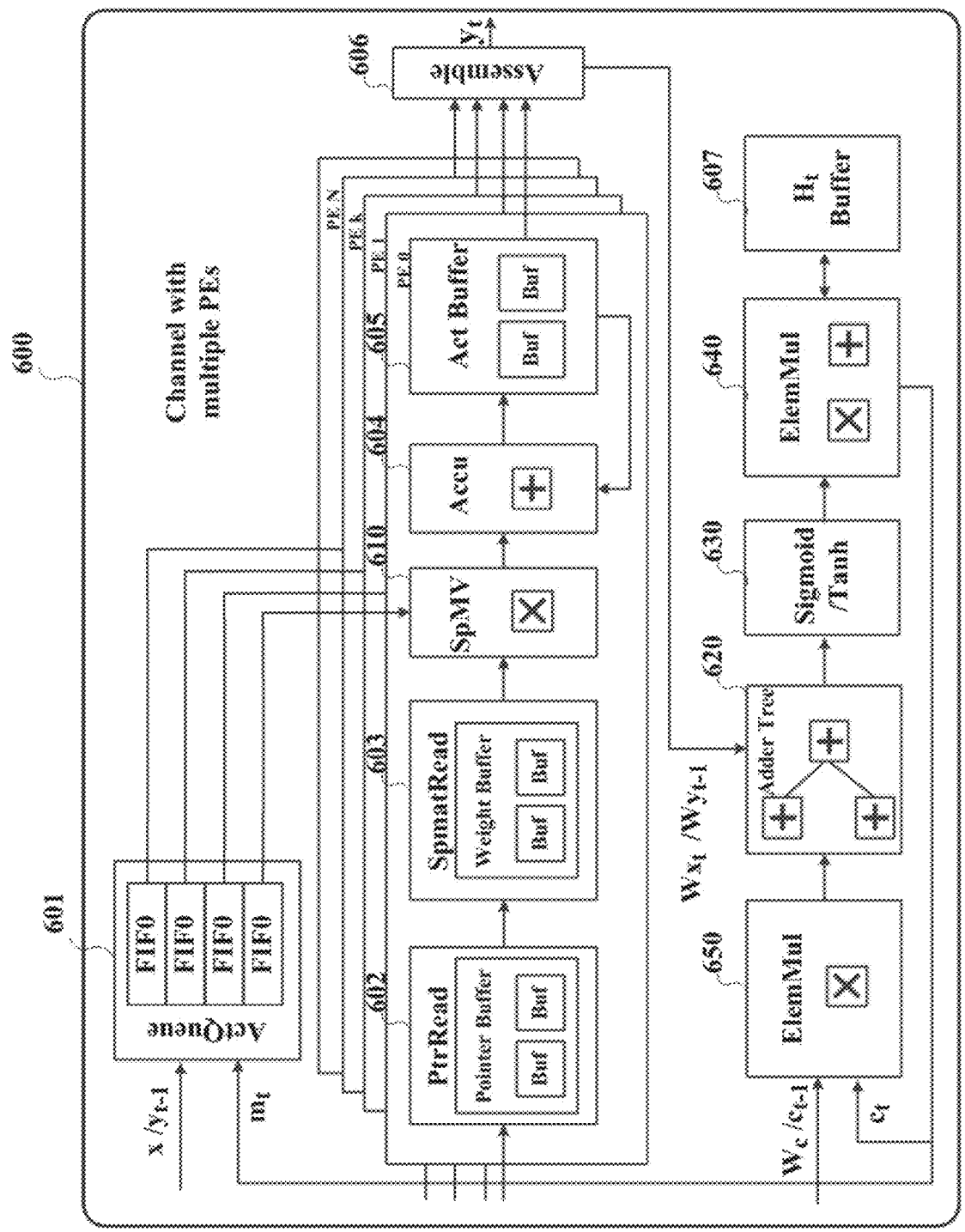
FIG. 6 illustrates an exemplary hardware accelerator having several PEs in accordance with the principles of the disclosure herein.

To further enhance the degree of parallelism, the hardware accelerator my include several Processing Elements (PEs) which take charge of most computation tasks in the LSTM model. PE is the basic computation unit for a slice of input vectors with partial weight matrix, and all PEs are averagely partitioned into several channels. Each channel implements the LSTM network for a input vector sequence independently. FIG. 6 illustrates an exemplary hardware accelerator having several PEs in accordance with the principles of the disclosure herein. The hardware accelerator may include several major components, which are input-vector Queue (Activation Vector Queue) 601, Sparse Matrix-vector Multiplier (SpMV) 610, Adder Tree 620, Sigmoid and Tanh Units (Sigmoid/Tanh) 630, Accumulator, Element-wise Multiplier (ElemMul) 640 and 650 and lots of buffers.

Activation Vector Queue (ActQueue) 601 can be the vector input module mentioned above and may include several FIFOs. Each FIFO stores elements of the input vector $a_j$ for each PE. ActQueue's function is to decouple the load imbalance across different PEs.

Pointer Read Unit (PtrRead) 602 and Sparse Matrix Read (SpmatRead) 603 manage the encoded weight matrix storage and output. The start and end pointers $p_j$ and $p_{j+1}$ for column j determine the start location and length of elements in one encoded weight column that should be fetched for each element of a input vector. SpmatRead uses pointers $p_j$ and $p_{j+1}$ to look up the non-zero elements in weight column j. Both PtrRead 602 and SpmatRead 603 include ping-pong buffers, which can be the two pointer matrix buffers and the two sparse buffers mentioned above.

In SpMV 610, each element in the input vector is multiplied by its corresponding weight column, and thus a new vector can be obtained. Multiplication results in the same row of all new vectors are summed to generate an element in the result vector. SpMV multiplies the input data by a column of weight, and the current partial result is written into partial result buffer ActBuffer 605.

Each of ElemMul 640 and 650 can generate one vector by consuming two vectors. Each element in the output vector is the element-wise multiplication of two input vectors.

Adder Tree 620 can perform summation by consuming the intermediate data produced by other units or bias data from input buffer.

Sigmoid/Tanh 630 are the non-linear modules applied as activation functions to some intermediate summation results.

Figure 7:
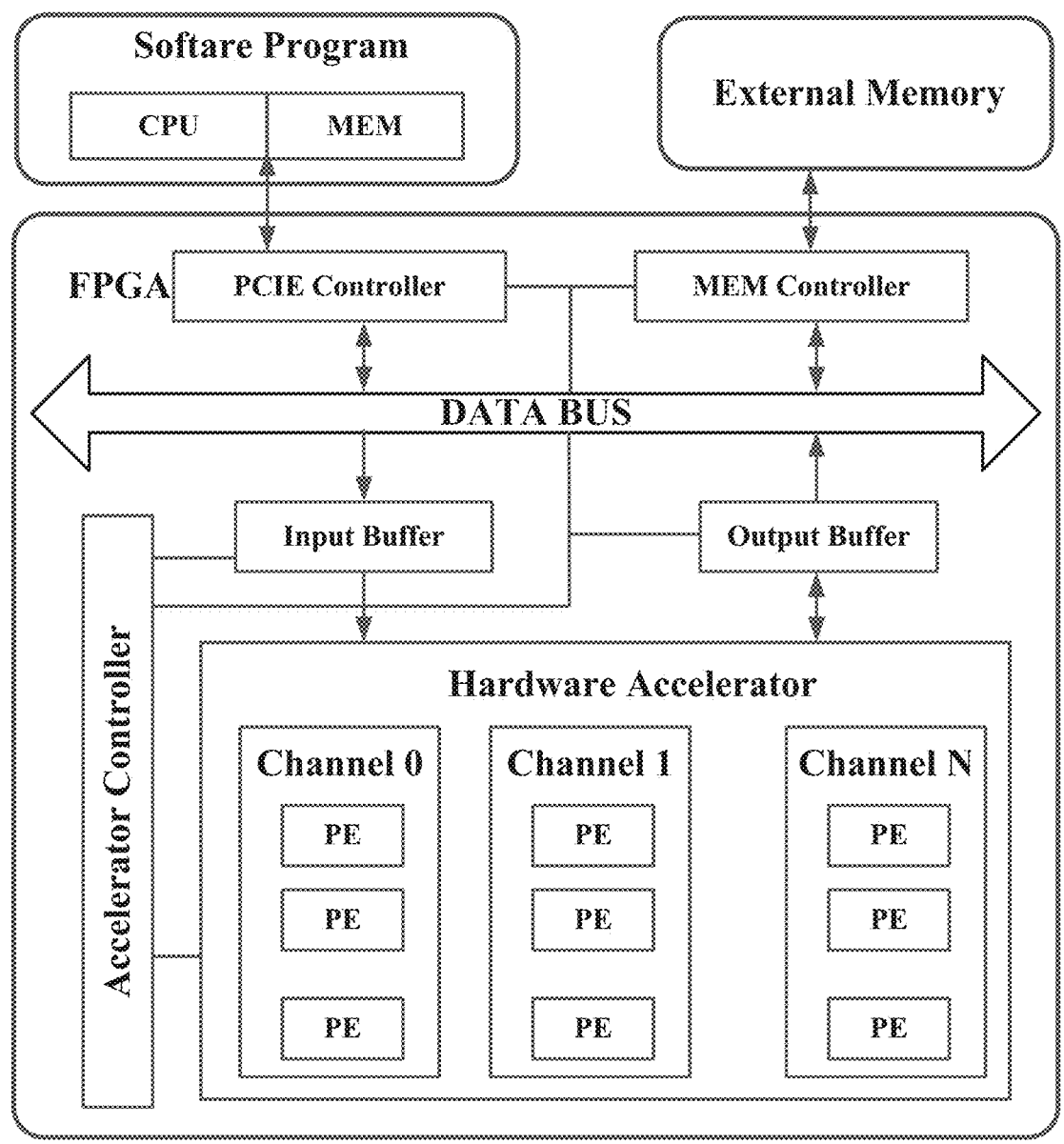
FIG. 7 illustrates an overview architecture of the accelerator system.

The architecture showed in FIG. 6 can be the overview architecture of one hardware accelerator, or can be one channel with multiple PEs. The hardware accelerator may have several channels, and can be a part of the whole system. FIG. 7 illustrates an overview architecture of the accelerator system. The system can be a speech recognition engineer accelerator system, and is a CPU and FPGA heterogeneous architecture to accelerate LSTM networks. On the FPGA chip, the inventors put the Processing Elements, Controller, PCIE Controller, MEM Controller, and On-chip Buffers.

The hardware accelerator consists of Processing Elements (PEs) which take charge of most computation tasks in the LSTM model. PE is the basic computation unit for a slice of input vectors with partial weight matrix, and all PEs are averagely partitioned into several channels. Each channel implements the LSTM network for a input vector sequence independently. On-chip buffers, including input buffer and output buffer, prepare data to be consumed by PEs and store the generated results. Controller determines the behavior of other circuits on FPGA chip. It schedules PCIE/MEM Controller for data-fetch and the LSTM computation pipeline flow of Accelerator.

Although a CPU and FPGA heterogeneous architecture is showed in FIG. 7, in another embodiment, the hardware accelerator can be implemented as an Application Specific Integrated Circuit (ASIC) core.

The efficient hardware accelerator and the system contained the same is proposed. The accelerator and the system can work directly on compressed LSTM model, and is optimized across the algorithm-software-hardware boundary: the inventors propose a hardware architecture that efficiently deals with the irregularity caused by compression, combined with the hardware-efficiency-pruned LSTM network and the scheduler that can map the complex LSTM operations on FPGA and achieve parallelism.

Comparing with the exist hardware accelerator for ANN, the present hardware accelerator is a hardware design not only for sparse matrix-vector multiplication, but for the whole LSTM network. The present accelerator focuses on the speech recognition in which the activation function is tanh and sigmoid, thus input vectors are dense. Besides, not like the exist design supports only matrix-vector multiplication by sharing vectors among Pes, the present accelerator extends matrix-vector multiplication to matrix-matrix multiplication to support batch mode. It reuses both input vectors and weight matrices. Finally, constrained by FPGA resource, accelerator cannot buffer all the weights on-chip, thus hiding latency is important. The present accelerator adopts double buffering and pipeline design to overlap the time of data transfer and computation.

The described embodiments of the invention are presented for the purpose of illustration and not of limitation. Although various embodiments have been described as having particular features and/or combinations of components, other embodiments are possible having a combination of any features and/or components from any of embodiments where appropriate. For example, hardware accelerator 300 can include a ActQueue similar to that of hardware accelerator 600. All such variations are intended to be included within the scope of the invention as encompassed by the appended claims.

What is claimed is:

1. A hardware accelerator for compressed Long Short Term Memory (LSTM) represented by sparse matrices, wherein an input at a current cycle (time t) of LSTM depends on an output at a previous cycle (time t−1), comprising:

a plurality of processing elements, each processing element has a sparse matrix-vector multiplier and an accumulator, the sparse matrix-vector multiplier configured to perform multiplication operations between elements of vectors and their corresponding columns of the sparse matrices, wherein each element in one vector is multiplied by its corresponding column in one of the sparse matrices to generate one new vector, and wherein the accumulator is configured to sum multiplication results in a same row of all new vectors to generate an element in a summation result vector;

an adder tree configured to perform summation on intermediate data produced by other components including the summation result vector from the accumulator to generate intermediate summation results;

a non-linear operation activator configured to apply an activation function to the intermediate summation results to generate non-linear operation results;

an element-wise multiplier for performing element-wise multiplication on the non-linear operation results and addition operations on element-wise multiplication results to obtain a first intermediate result vector of a current cycle; and a diagonal matrix multiplier configured to perform a multiplication operation between a diagonal matrix and the first intermediate result vector of the current cycle or a first intermediate result vector of a previous cycle to obtain a diagonal matrix multiplication result, wherein the adder tree is further configured to add the diagonal matrix multiplication result into an accumulated result.

2. The hardware accelerator of claim 1, wherein, the diagonal matrix multiplier is a second element-wise multiplier.

3. The hardware accelerator of claim 1, wherein the sparse matrix-vector multiplier is configured to perform a sparse matrix multiplication operation on an input vector $x_t$ of the current cycle, an output vector $y_{t-1}$ of a previous cycle, and a second intermediate result vector $m_t$ of the current cycle;

wherein the second intermediate result vector $m_t$ of the current cycle is calculated based on the input vector $x_t$ of the current cycle, the output vector $y_{t-1}$ of the previous cycle, and the first intermediate result vector $C_t$ of the current cycle; and wherein the sparse matrix-vector multiplier is configured to obtain an output vector $y_t$ of the current cycle by performing a sparse matrix-vector multiplication operation on the second intermediate result vector $m_t$ of the current cycle.

4. The hardware accelerator of claim 3, wherein the non-linear operation results comprise an input gate control vector of the current cycle $i_t$, a forget gate control vector of the current cycle $f_t$, an output gate control vector of the current cycle $o_t$, a cell input activation vector of the current cycle $g_t$, and a cell output activation vector of the current cycle $h_t$;

wherein the first intermediate result vector is a cell activation vector of the current cycle $c_t$, wherein the second intermediate result vector is a cell output activation vector of the current cycle $m_t$.

5. The hardware accelerator of claim 1, wherein the sparse matrix-vector multiplier is configured to add a bias vector to the sparse matrix-vector multiplication results; or wherein the addition tree module is configured to accumulate a bias vector into the accumulated result.

6. The hardware accelerator of claim 1, wherein the sparse matrix-vector multiplier comprises:

two sparse matrix buffers configured in an alternate buffer mode for buffering sparse matrix coefficients, two pointer buffers configured in an alternate buffer mode; and two output buffers configured in an alternate buffer mode.

7. The hardware accelerator of claim 1, further comprising:

a vector input buffer for inputting a vector to be calculated in the sparse matrix-vector multiplier, and an output buffer connected to the sparse matrix-vector multiplier for outputting a final calculation result vector of the current cycle;

wherein the output buffer is configured to buffer a final calculation result vector of a previous cycle and supplying the final calculation result vector to the vector input buffer.

8. The hardware accelerator of claim 7, each of the plurality of processing elements comprises a FIFO that provides its corresponding processing element with different elements in a vector to be calculated, and the plurality of processing elements execute a partial sparse matrix-vector multiplication operation for the vector in parallel.

9. The hardware accelerator of claim 1, wherein the activation function is one of a sigmoid function, and a tanh function.

10. The hardware accelerator of claim 1, wherein, the hardware accelerator is implemented as an Application Specific Integrated Circuit (ASIC) core.

11. The hardware accelerator of claim 1, wherein, the hardware accelerator is implemented as a field-programmable gate array (FPGA).

12. The hardware accelerator of claim 1, wherein, the compressed LSTM is configured for speech recognition.

13. A speech recognition engineer accelerator system, comprising:

a processor configured to execute speech recognition that uses a compressed Long Short Term Memory (LSTM) represented by sparse matrices, as an acoustic model; and the hardware accelerator of claim 1.

14. The system of claim 13, wherein, the hardware accelerator is implemented as a part of a FPGA structure, the FPGA structure further comprising:

on-chip buffers, including an input buffer and an output buffer, for preparing data to be consumed by the hardware accelerator and storing calculation results generated by the hardware accelerator; and a controller for scheduling a PCIE/MEM controller for data-fetch and a LSTM computation pipeline flow of the hardware accelerator.

* * * * *